United States Patent [19]

Ishiguro et al.

[11] Patent Number: 5,459,595

[45] Date of Patent: Oct. 17, 1995

[54] ACTIVE MATRIX LIQUID CRYSTAL DISPLAY

[75] Inventors: Kenichi Ishiguro, Tenri; Hirohisa Tanaka, Ikoma, both of Japan

[73] Assignee: Sharp Kabushiki Kaisha, Japan

[21] Appl. No.: 13,642

[22] Filed: Feb. 4, 1993

[30] Foreign Application Priority Data

Feb. 7, 1992 [JP] Japan .................. 4-022911
Apr. 22, 1992 [JP] Japan .................. 4-103191

[51] Int. Cl.⁶ .................................. G02F 1/1343
[52] U.S. Cl. .................................. 359/59; 359/67
[58] Field of Search ..................... 359/59, 67, 54

[56] References Cited

U.S. PATENT DOCUMENTS

| | | | |
|---|---|---|---|
| 4,653,862 | 3/1987 | Morozumi | 359/67 |
| 4,687,298 | 8/1987 | Aoki et al. | 359/67 |
| 4,881,797 | 11/1989 | Aoki et al. | 359/67 |
| 4,948,231 | 8/1990 | Aoki et al. | 359/67 |
| 5,128,786 | 7/1992 | Yanagisawa | 359/67 |
| 5,142,392 | 8/1992 | Ueki et al. | 359/67 |

OTHER PUBLICATIONS

*SID 91 Digest*, pp. 215–218, Tsumura et al: "High–Resolution 10.3-in.–Diagonal Multicolor TFT–LCD".

*Primary Examiner*—William L. Sikes
*Assistant Examiner*—Huy Mai
*Attorney, Agent, or Firm*—Nixon & Vanderhye

[57] ABSTRACT

A parasitic capacitance is not caused between a shielding film and a gate line and between a pixel electrode and the gate line in a liquid crystal display of the present invention because the shielding film and the pixel electrode do not overlap the gate lines. The display characteristics are thus improved. Furthermore, since the counter shielding film is formed so as to cover a smaller gap of one between the shielding film and the gate line and one between the gate line and pixel electrode, light leak through the gap can be blocked. The shielding film can be small because it only covers the gap, thereby preventing a degradation of an aperture ratio. Moreover, a degradation of yield caused by increasing a number of production steps is also prevented because the production steps are not complicated. In another aspect of the liquid crystal display of the present invention, since the gate line is electrically connected to a counter electrode, a part of the parasitic capacitance caused between the pixel electrode and the shielding film end between the pixel electrode and the gate line is connected in parallel to a capacitance of liquid crystal and used as a storage capacitance. As a result, the parasitic capacitance less influences on the display characteristics, which is thus further improved. Further, since storage capacitance lines are not required, the aperture rate is not degraded and a degradation of yield caused by increasing a number of the production steps is prevented.

5 Claims, 15 Drawing Sheets

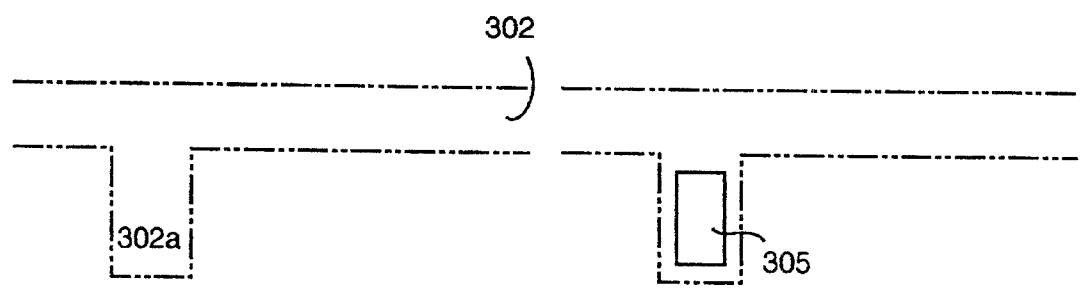
FIG. 7A
FIG. 7B
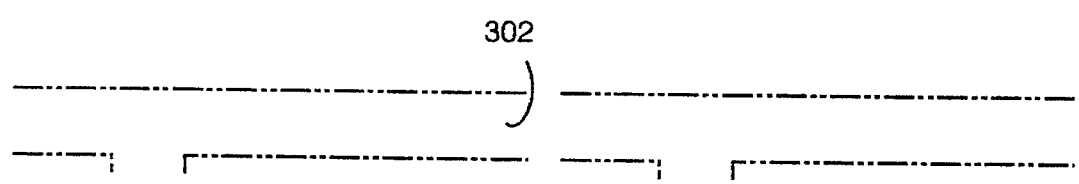
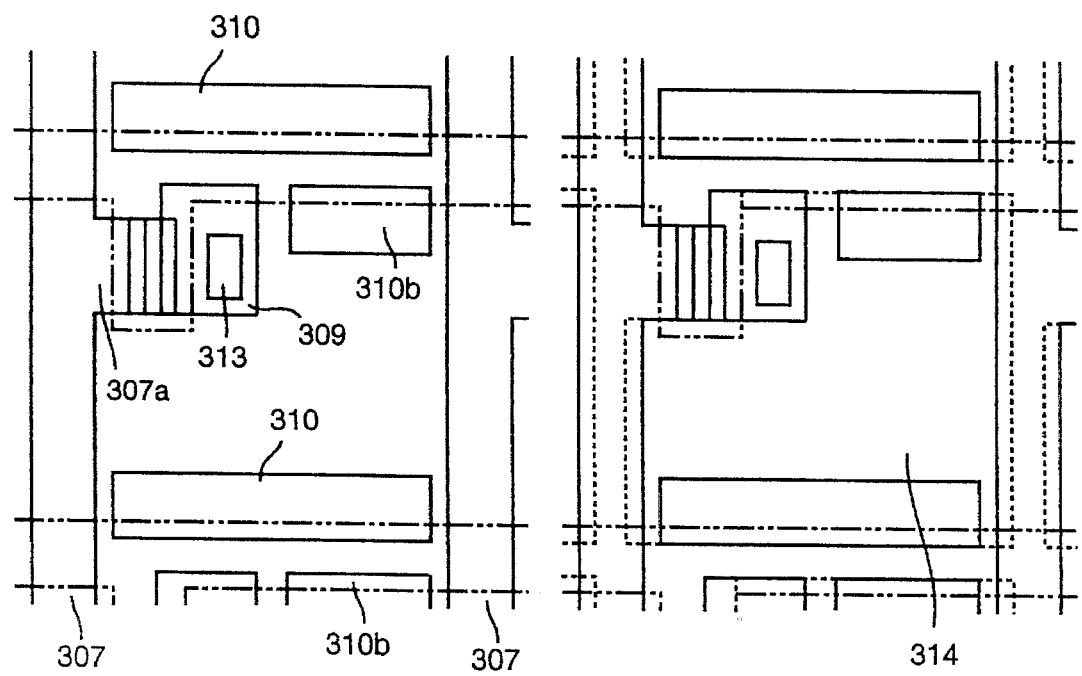
FIG. 7C
FIG. 7D

ACTIVE MATRIX LIQUID CRYSTAL DISPLAY

BACKGROUND OF THE INVENTION

1. Field of the Invention

The present invention relates to an active matrix liquid crystal display comprising an active matrix substrate on which switching elements are formed in the shape of a matrix, a counter substrate opposed to the active matrix substrate and a liquid crystal layer therebetween.

2. Description of the Related Art

Liquid crystal displays have attracted attention as a display used instead of a CRT (cathode ray tube) due to their characteristics of saving space and low power. Among such liquid crystal displays, thin film transistor (hereinafter referred to as the "TFT") activated liquid crystal displays are superior because the liquid crystal therein responds at a high rate and images are displayed with high quality. Especially, TFTs made from amorphous silicon (hereinafter referred to as "a-Si") have been remarkably developed in recent years since films can be formed at a low temperature in such TFTs so that they can provide a more accurate and less expensive displays showing a larger picture.

FIG. 16 is a plan view showing an example of a conventional liquid crystal display using the a-Si in the TFTs. FIGS. 17 and 18 are sectional views taken on lines A-A' and B-B' of FIG. 16, respectively. The liquid crystal display comprises an active matrix substrate 122 on which TFTs 124 are formed in the shape of a matrix, a counter substrate 123 opposed to the active matrix substrate 122 and a liquid crystal layer 116 sandwiched therebetween. A structure of such a liquid crystal display will now be described in details based on its production steps as follows:

First, a metal than film is formed on a transparent insulating glass substrate 101 to form gate lines 102 as scanning lines and gate electrodes 102a branched from the gate lines 102. A $SiN_x$ film as a first insulating film 103, an a-Si layer as a semiconductor layer 104 of the TFTs 124 and another $SiN_x$ film as a second insulating film 105 are successively formed on the entire top surface of the glass substrate 101. The second insulating film 105 is then patterned as is shown in FIG. 16.

Next, after forming a metal thin film thereon, an $n^+$ layer 106 doped with P is formed for making an ohmic contact with the a-Si layer 104. Then, source lines 107 as signal lines having a pattern as is shown in FIG. 16, source electrodes 107a branched from the source lines 107, drain electrode/shielding films 108 and shielding films 110 are respectively formed. The TFTs 124 each having a sectional structure as shown in FIG. 17 are formed near respective crossings of the gate electrodes 102a and source electrodes 107a.

Then, a third insulating film 112 is formed on the entire top surface of the resultant glass substrate 101, and contact holes 113 are formed in the third insulating film 112. A transparent conductive film is then formed so as to fill the contact holes 113 and partially cover the gate lines 102 to form pixel electrodes 114. An alignment layer 115 is further applied on the pixel electrodes 114, and then treated by a rubbing method. The active matrix substrate 122 is thus formed.

The counter substrate 123 is fabricated as follows: A color filter 120 is patterned on a transparent insulating glass substrate 121, if necessary. A transparent conductive film is formed over the entire top surface of the patterned substrate to form a counter electrode 118. An alignment layer 117 is then formed on the counter electrode 118, and is treated by the rubbing method.

The active matrix substrate 122 and the counter substrate 123 are then adhered to each other, and liquid crystal is injected therebetween to form the liquid crystal layer 116. The liquid crystal display is fabricated in this manner.

In such a liquid crystal display, the drain electrode/shielding films 108 serving as both the drain electrodes and the shielding films as well as the shielding films 110 are provided above the gate lines 102 as is shown in FIG. 18 for the following reason: In obtaining high accuracy by increasing the number of pixels in a unit area, 1-Horizontal inversion driving for inverting polarity of signals applied to the pixel electrodes 114 by gate line 102 is adopted, because more pixels decrease the interval between the adjacent pixels. In this case, an interaction is caused between the adjacent pixel electrodes 114 to disturb the electric field over the gate lines 102. As a result, the liquid crystal particles are also disturbed, and, for example, light is leaked while displaying black in the normally white mode of the liquid crystal, resulting in degraded contrast. The shielding films 108 and 110 are formed above the gate lines 102 to shield the light leak, thereby preventing the degradation of the contrast.

A system in which the shielding films are formed above the source lines of the active matrix substrate is also known (M. Tsumura et al., "High-Resolution 10.3-in. Diagonal Multicolor TFT-LCD", *SID 91 DIGEST*, pp. 215–218). In this system, contrast is degraded due to light leak caused by the disturbed electric field on the gate lines in the 1-Horizontal inversion driving as mentioned above. In the 1-Vertical inversion driving for inverting polarity of signals applied to the pixel electrodes by source lane, the degradation of contrast can be avoided because the electric field is disturbed above the source lines. However, in this system, an IC for driving has a disadvantageously large load because it is impossible to drive the counter electrode on the counter substrate so as to aid the application of signals to the pixels.

For the reasons described above, the shielding films 108 and 110 are formed above the gate lines 102 in the conventional liquid crystal displays.

In such conventional liquid crystal displays, as is evident from FIGS. 17 and 18, a parasitic capacitance is generated in overlapped portions between the drain electrode/shielding films 108 and gate lines 102, shielding films 110 and the gate lines 102, or the pixel electrodes 114 and the gate lanes 102, thereby degrading display characteristics. An effect of the parasitic capacitance on the display characteristics is represented by a ratio obtained by the following equation (I):

$$\left(\begin{array}{c}\text{Parasitic}\\\text{Capacitance}\end{array}\right) / \left(\begin{array}{c}\text{Capacitance of}\\\text{Liquid Crystal}\end{array}\right) + \\ \left(\begin{array}{c}\text{Storage}\\\text{Capacitance}\end{array}\right) + \left(\begin{array}{c}\text{Parasitic}\\\text{Capacitance}\end{array}\right) \qquad \text{Equation (I)}$$

Since the conventional liquid crystal has no storage capacitance, the parasitic capacitance largely affects display characteristics. However, in order to provide a storage capacitance with each pixel to solve this problem, lines and the like for storage capacitance should be formed, resulting in reducing the aperture ratio. Furthermore, when the lines for the storage capacitance are formed from a transparent conductive material so as not to reduce the aperture ratio, the yield is degraded because of the additional production steps.

SUMMARY OF THE INVENTION

The active matrix liquid crystal display of this invention comprises an active matrix substrate having a plurality of parallel scanning lines, a plurality of parallel signal lines crossing the scanning lines, pixel electrodes respectively formed in substrate portions defined by two adjacent scanning lines and two adjacent signal lines, switching elements each of which is connected to a corresponding pixel electrode, a corresponding scanning line and a corresponding signal line, and pairs of first shielding films, each pair being provided along both sides of each scanning line, for blocking light leak along the scanning lines; a counter substrate opposed to the active matrix substrate having a counter electrode and second shielding films for blocking light leak which is not blocked by the first shielding films; and a liquid crystal layer between the active matrix substrate and the counter substrate.

In an embodiment, none of the first shielding films overlay the scanning lines.

In another embodiment, the second shielding film covers the smaller one of: (1) gaps between the pair of first shielding films and the scanning line sandwiched thereby; and (2) gaps between the pixel electrode and the scanning line.

In still another embodiment, the switching elements are thin film transistors, and a drain in each thin film transistor also serves as one of the pair of first shielding films.

In still another embodiment, the signal lines are made from a type material as used for the first shielding films.

Alternatively, the active matrix liquid crystal display of the present invention comprises an active matrix substrate having a plurality of parallel scanning lines, a plurality of parallel signal lines crossing the scanning lines, pixel electrodes respectively formed in substrate portions defined by two adjacent scanning lines and two adjacent signal lines, switching elements each of which is connected to a corresponding pixel electrode, a corresponding scanning line and a corresponding signal line, and first shielding films each of which is formed so as to overlay an adjacent pixel electrode for blocking light leak along the scanning lines; a counter substrate opposed to the active matrix substrate having a counter electrode electrically connected to the scanning lines; and a liquid crystal layer between the active matrix substrate and the counter substrate.

In an embodiment, the active matrix liquid crystal display further comprises second shielding films respectively opposed to the shielding films across the scanning lines.

In another embodiment, the switching elements are thin film transistors, and a drain in each thin film transistor also serves as the second shielding film.

In still another embodiment, the first shielding film and the second shielding film overlaying the same pixel electrode are electrically connected to each other.

In still another embodiment, the active matrix liquid crystal display further comprises connecting means for connecting the first shielding film and the second shielding film.

In still another embodiment, the connecting means is made from a transparent conductive film.

In still another embodiment, the first shielding film and the second shielding film are integrated.

In still another embodiment, the signal lines are made from a type of material as used for the first shielding films.

In still another embodiment, the signal lines, the first shielding films and the second shielding films are made from the same type of material.

In still another embodiment, none of the second shielding films overlay the scanning lines, and the counter substrate comprises third shielding films covering the smaller one of: (1) gaps between the second shielding film and the scanning line; and (2) gaps between the pixel electrode and the scanning line.

In still another embodiment, the switching elements are thin film transistors, and a drain in each thin film transistor also serves as the second shielding film.

In still another embodiment, the first shielding film and the second shielding film overlaying the same pixel electrode are electrically connected to each other.

Thus, the invention described herein makes possible the advantages of (1) providing an active matrix liquid crystal display having display characteristics improved by preventing a parasitic capacitance; (2) providing an active matrix liquid crystal display having display characteristics improved by preventing a parasitic capacitance without degrading the aperture ratio; (3) providing an active matrix liquid crystal display having display characteristics improved by preventing a parasitic capacitance without degrading the aperture ratio while preventing degradation of yield caused by increasing the number of production steps; (4) providing an active matrix liquid crystal display having display characteristics improved by utilizing a parasitic capacitance as a storage capacitance; (5) providing an active matrix liquid crystal display having display characteristics improved by utilizing a parasitic capacitance as a storage capacitance while preventing degradation of yield caused by increasing the number of production steps; and (6) providing an active matrix liquid crystal display having display characteristics improved by utilizing a parasitic capacitance as a store capacitance while decreasing the amount of the parasitic capacitance.

These and other advantages of the present invention will become apparent to those skilled in the art upon reading and understanding the following detailed description with reference to the accompanying figures.

BRIEF DESCRIPTION OF THE DRAWINGS

FIGS. 7A through 7D are plan views showing a production method of the liquid crystal display of FIG. 5.

DESCRIPTION OF THE PREFERRED EMBODIMENTS

The present invention will now be described in detail by way of example with reference to the accompanying drawings.

EXAMPLE 1

Figure 1:
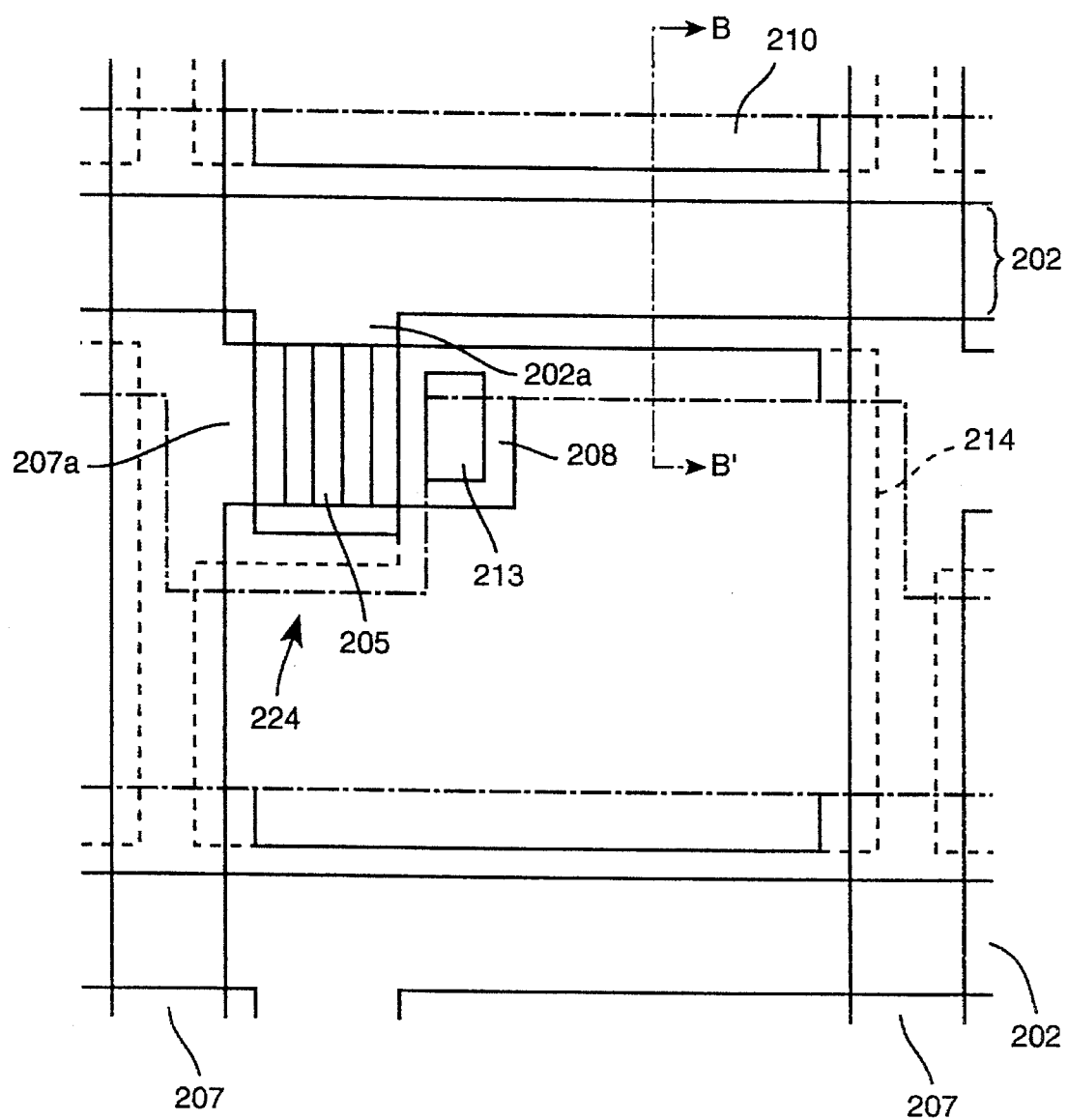
FIG. 1 is a fragmentary plan view of an active matrix liquid crystal display as a first example of the present invention.
Figure 2:
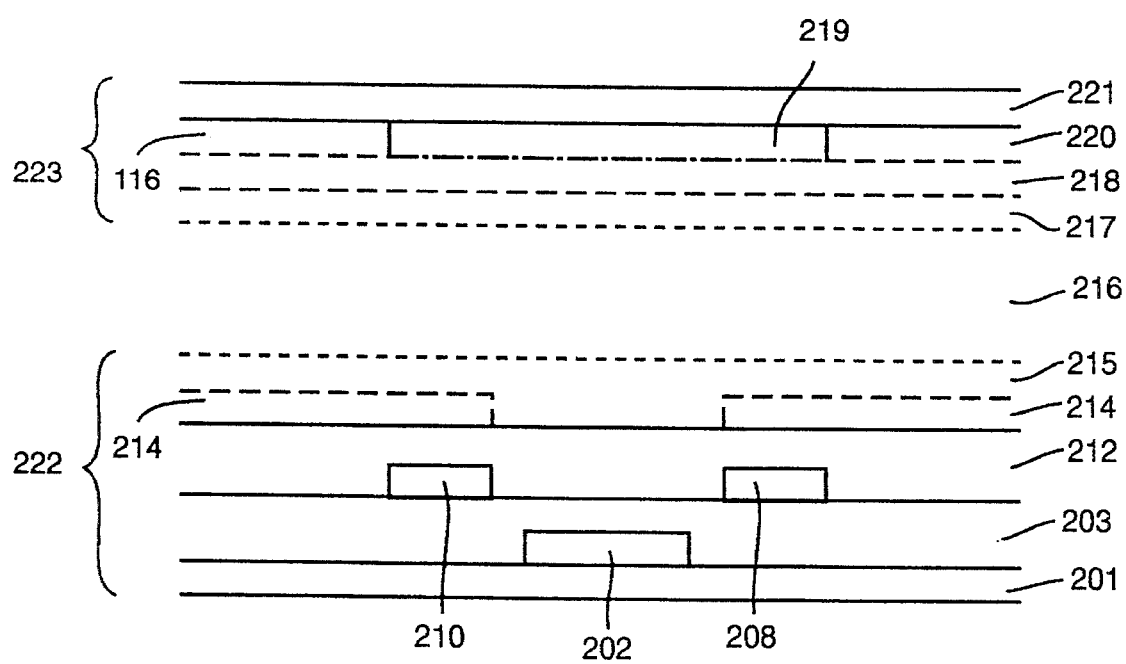
FIG. 2 is a sectional view taken on line B-B' of the liquid crystal display of FIG. 1.

FIG. 1 is a plan view showing an active matrix liquid crystal display according to this example. FIG. 2 is a sectional view taken on line B-B' of the active matrix liquid crystal display of FIG. 1. The liquid crystal display comprises an active matrix substrate 222 on which TFTs 224 are formed in the shape of a matrix, a counter substrate 223 opposed to the active matrix substrate 222 and a liquid crystal layer 216 sandwiched therebetween. The active matrix substrate 222 comprises an insulating glass substrate 201 as the lowest layer, gate lines 202 formed thereon as horizontally extending scanning lines, and gate electrodes 202a of the TFTs 224 branched from the gate lines 202.

On the glass substrate 201 bearing the gate lines 202 and gate electrodes 202a, a first insulating film 203 made from $SiN_x$ is formed, and an a-Si layer (not shown) is further formed so as to cover the first insulating film 203 at positions where the gate electrodes 202a are formed. A second insulating film 205 also made from $SiN_x$ is formed on the a-Si film. Source lines 207 as signal lines made from a metal and source electrodes 207a of the TFTs 224 branched from the source lines 207 are disposed on the resultant glass substrate 201. Each source electrode 207a partially overlays a left side portion of each gate electrode 202a with a dielectric layer (such as the first insulating film 203 and the like) interposed therebetween. A shielding film 208, which also works as a drain electrode of each TFT 224, (hereinafter referred to as the "drain electrode/shielding film") is formed over a right side portion of each gate electrode 202a so as to occupy a larger area than the right side portion. Another shielding film 210 is formed facing the drain electrode/shielding film across the gate line 202. The wording "shielding" herein means preventing light leak which degrades contrast of the liquid crystal display.

Furthermore, a third insulating film 212 (having a plurality of contact holes 213) is formed over almost the entire surface of the glass substrate 201 bearing the above-mentioned films, etc. ITO (indium tin oxide) is deposited on the third insulating film 212 so as to come in contact with the drain electrode corresponding portion of each drain electrode/shielding film 208 through each contact hole 213, thereby forming pixel electrodes 214. An alignment layer 215 is further formed on the top surface of the resultant glass substrate 201.

The counter substrate 223 opposed to the above-mentioned active matrix substrate 222 has the following structure: Color filters 220 and counter shielding films 219 are formed in a desired pattern on an insulating glass substrate 221. A counter electrode 218 is formed thereon by coating the entire top surface of the patterned glass substrate 221 with ITO. An alignment layer 217 is further formed thereon. Each color filter 220 is opposed to each of the pixel electrodes 214.

A production method for such an active matrix liquid crystal display will now be described referring to FIGS. 3A through 3F.

Figure 3A:
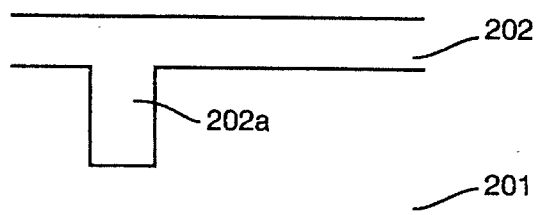
FIGS. 3A through 3F are plan views showing a production method of the liquid crystal display of FIG. 1.

(1) As is shown in FIG. 3A, a Ta film having a thickness of, for example, 3000 angstroms is formed and patterned on the glass substrate 201, thereby forming the gate lines 202 and the gate electrodes 202a. Instead of glass, substrate 201 can be formed from other light permeable materials or a transparent substrate coated with a transparent insulating film.

Figure 3B:
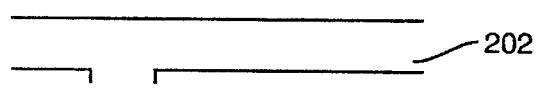

(2) The $SiN_x$ film as the first insulating film 203 having a thickness of, for example, 3000 angstroms is formed by sputtering or by plasma CVD on the entire surface of the glass substrate 201 obtained in step (1). The a-Si layer (not shown) as the semiconductor layer of the TFTs 224 having a thickness of, for example, 300 angstroms and the $SiN_x$ film as the second insulating film 205 having a thickness of, for example, 2000 angstroms are then successively formed on the entire top surface of the glass substrate 201 and etched to pattern the second insulating film 205 as shown in FIG. 3B.

An additional insulating film can be formed by an anodization of the gate lines 202 before the first insulating film 203. The first insulating film 203 can be made from any other common insulating materials apart from $SiN_x$.

Figure 3C:
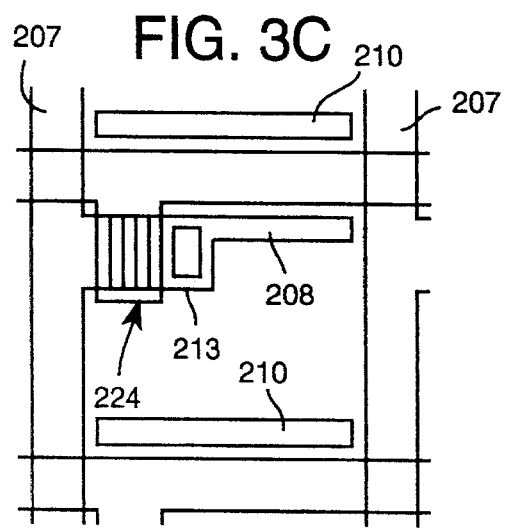

(3) Then, a-Si doped with P having a thickness of, for example, 500 angstroms is coated on the entire top surface by plasma CVD and patterned to provide a-Si layers (not shown) at portions where the TFTs 224 are formed. A Mo layer having a thickness of, for example, 3000 angstroms is formed by sputtering and etched to form the source lines 207, the source electrodes 207a, the drain electrode/shielding films 208 and the shielding films 210 in a pattern as is shown in FIG. 3C. Care should be taken so as not to allow the drain electrode/shielding films 208 and the shielding films 210 to overlap the gate lines 202, bearing alignment deviation in mind.

(4) Next, the third insulating film 212 is formed by coating the entire top surface of the resultant glass substrate 201 with an organic passivation having a thickness of, for example, 1 μm. Then the contact holes 213 are formed by etching on the third insulating film 212. Examples of a material for the organic passivation include an acrylic resin such as JSS-7215 (produced by Japan Synthetic Rubber Co., Ltd.), a polyimide such as PIX-8803 (produced by Hitachi Chemical Co., Ltd.), and a photosensitive polyimide such as S414 (produced by Toray Industries, Inc.). The third insulating film 212 can be made from an inorganic material such as $SiN_x$, $SiO_2$ and the like apart from the organic materials.

Figure 3D:
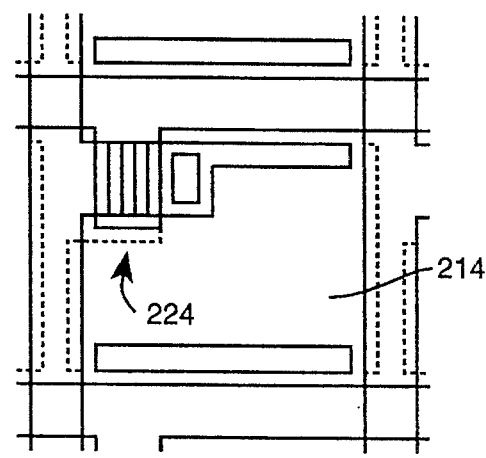

(5) ITO is deposited so as to cover the third insulating film 212 and fill the contact holes 213 by sputtering and photo-etched, as is shown in FIG. 3D, to form the pixel electrodes 214 each having a thickness of, for example 1000 angstroms. Care should be taken not to allow the pixel electrodes 214 to overlap the gate lines 202, bearing alignment deviation in mind. The alignment layer 215 is formed by coating the entire top surface of the structure thus formed with a polyimide and the like, and is treated by the rubbing method.

Figure 2A:
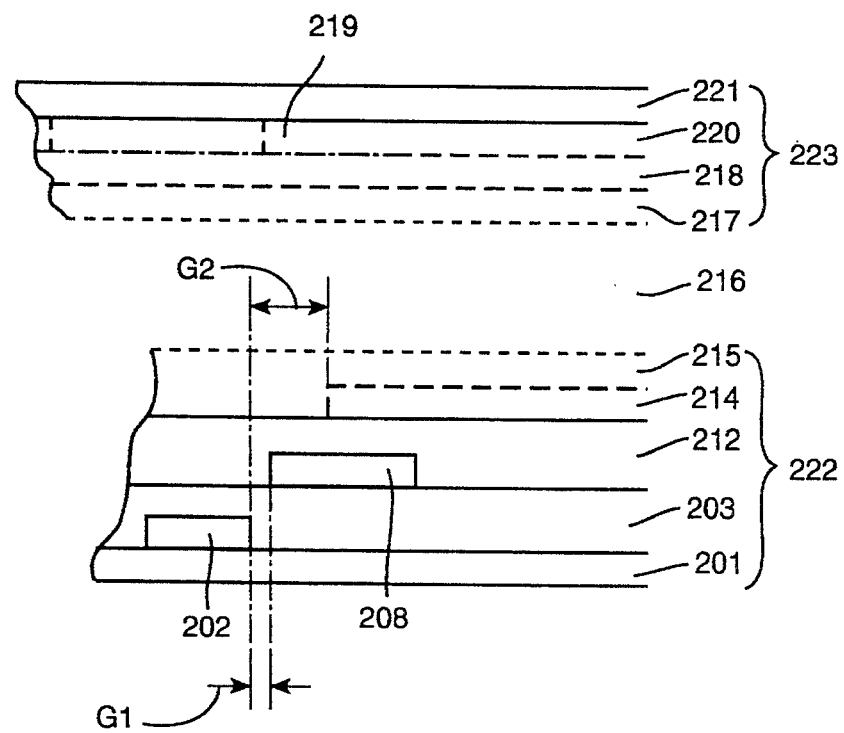
FIGS. 2A, 2B, 2C, and 2D are sectional views of showing differing gap configurations possible for the display of FIG. 1.
Figure 2B:
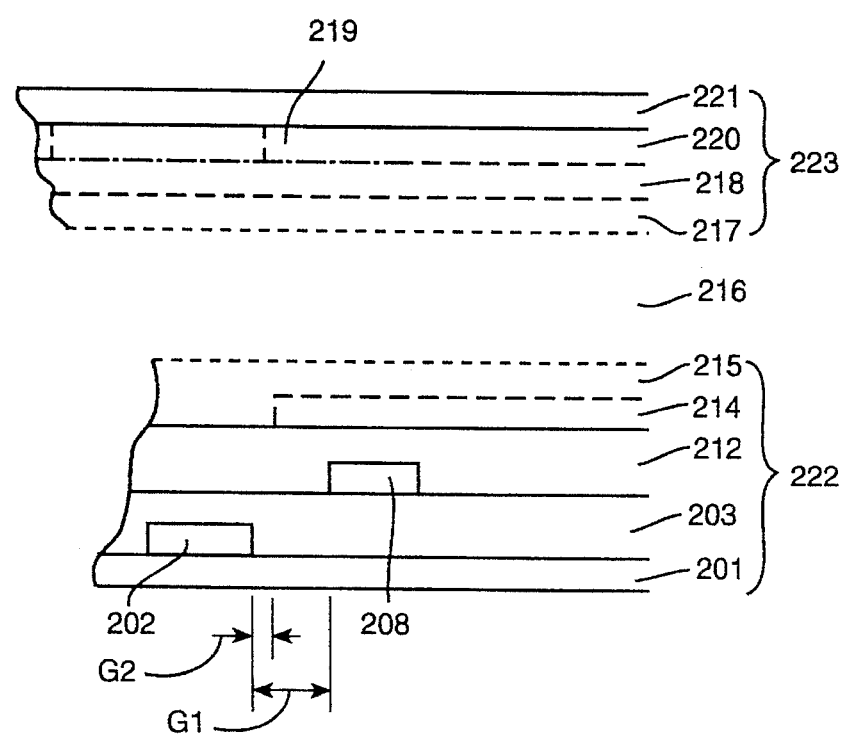
Figure 2C:
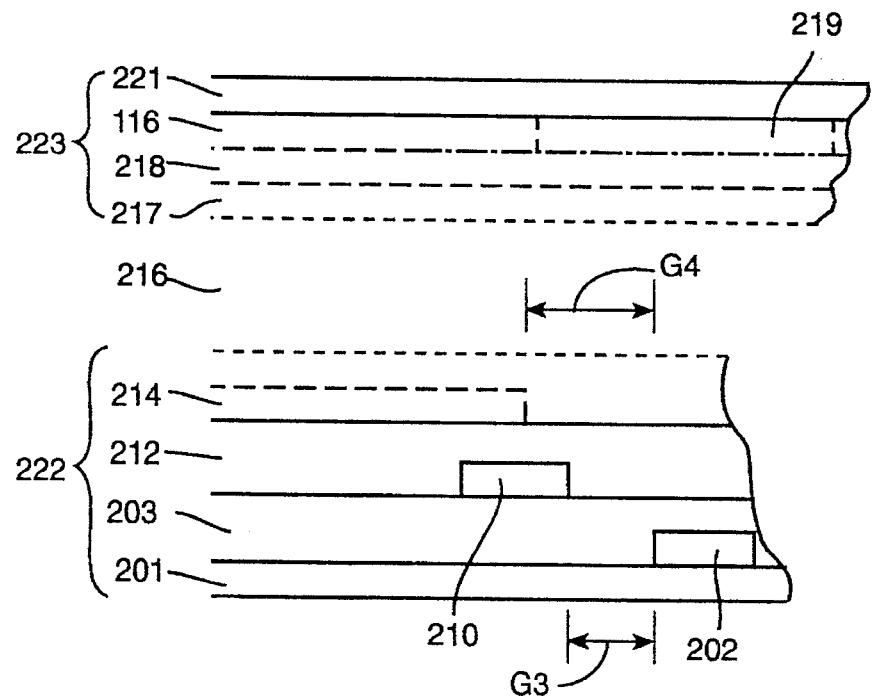
Figure 2D:
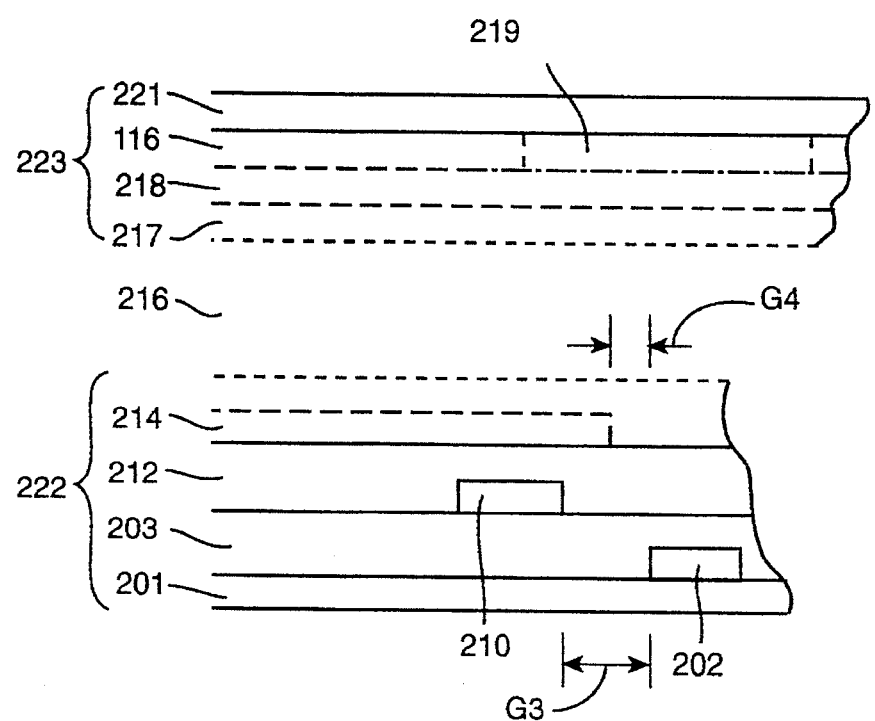
Figure 3E:
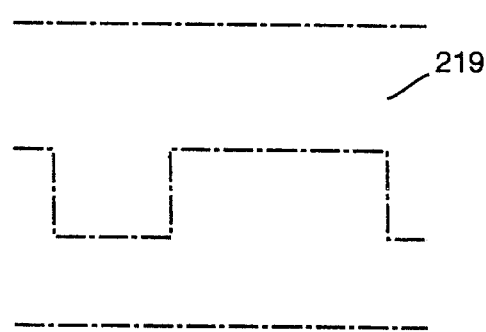

(6) The counter substrate 223 is fabricated as follows: The counter shielding film 219 in a pattern as shown in FIG. 3E and the color filter 220 are formed on the glass substrate 221. When the ends of the pixel electrodes 214 are located just above the ends of the drain electrode/shielding film 208 and the shielding film 210 as is shown in FIG. 2, the counter shielding film 219 is provided so as to cover a gap between the gate line 202 and the drain electrode/shielding film 208 and a gap between the gate line 202 and the shielding film 210. When the end of the pixel electrode 214 is not located just above the end of the drain electrode/shielding film 208, the counter shielding film 219 covers the smaller one of: 1) gap G1 between the gate line 202 and the drain electrode/shielding film 208; and 2) gap G2 between the gate line 202 and the pixel electrode 214 (See the cases illustrated in FIGS. 2A and 2B). When the end of the pixel electrode 214 is not located just above the end of the shielding film 210, the counter shielding film 219 covers the smaller one of: 1) gap G3 between the gate line 202 and the shielding film 210; and 2) gap G4 between the gate line 202 and the pixel electrode 214 (See the cases illustrated in FIGS. 2C and 2D).

ITO is deposited on the entire top surface of the glass substrate 221 obtained in the above-mentioned manner to form the counter electrode 218. The alignment layer 217 is further formed thereon by using a polyimide and the like, and treated by the rubbing method. The glass substrate 221 can be replaced by an insulating substrate made from any of the other light permeable materials, or a transparent substrate coated by a transparent insulating film. The color filter 220 can be omitted, if desired. This step (6) can be conducted before the above described steps (1) through (5), that is, the production of the active matrix substrate.

Figure 3F:
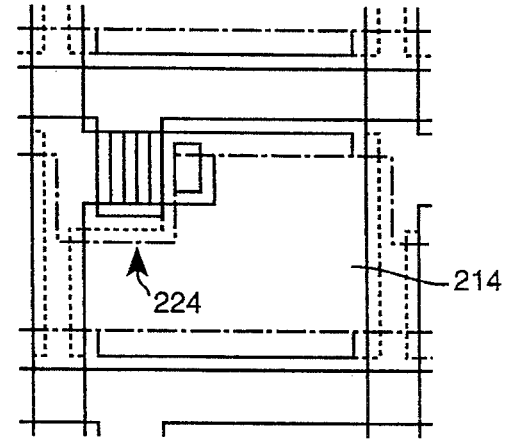

(7) Finally, the active matrix substrate 222 and the counter substrate 223 are adhered to each other as is shown in FIG. 3F. Liquid crystal is injected between the two substrates as the liquid crystal layer 216 to obtain a liquid crystal cell.

Figure 18:
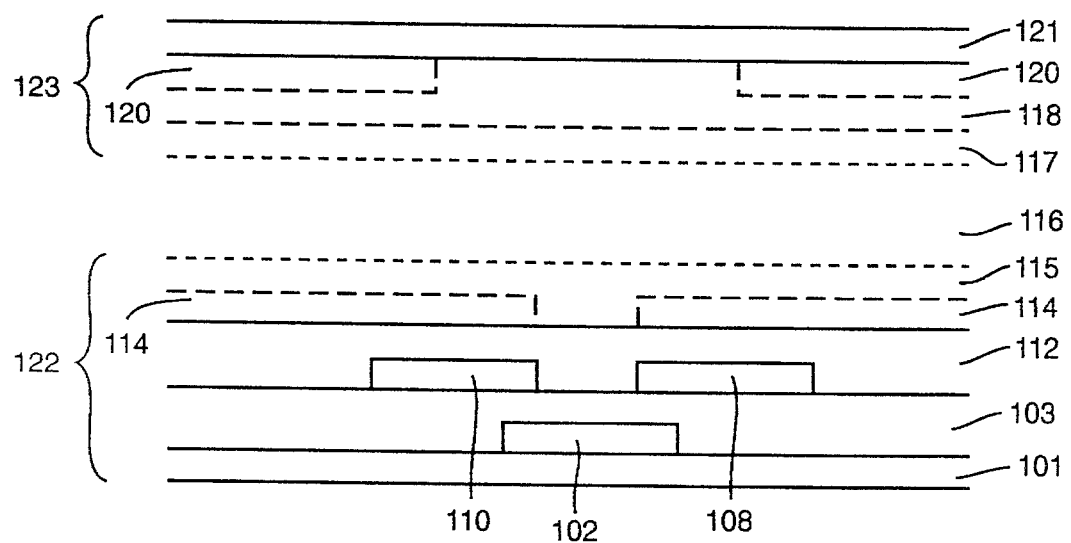
FIG. 18 is a sectional view taken on line B-B' of the conventional liquid crystal display of FIG. 16.

In the active matrix liquid crystal display fabricated in the above-mentioned manner, the gate lines 202 do not overlap the drain electrode/shielding films 208 and the shielding films 210 as shown in FIG. 18. Therefore, a parasitic capacitance is not caused between the gate lines 202 and the drain electrode/shielding films 208 and between the gate lines 202 and the shielding films 210. Moreover, the gate lines 202 overlap neither the pixel electrodes 214 nor the drain electrode/shielding films 208 and the shielding films 210. Therefore, no parasitic capacitance is caused between the gate lines 202 and the pixel electrodes 214 as well. Thus, the degradation of the display characteristics due to parasitic capacitance is prevented.

Accuracy in adhering the two substrates is lower than the alignment accuracy. Therefore, in the prior art, the counter shielding film formed on the counter substrate generally must have a sufficient size, resulting in lowering the aperture ratio. However, according to the present invention, the counter shielding film 219 can be small because it must shield only gaps between the gate line 202 and the drain electrode/shielding film 208 and gaps between the gate line 202 and the shielding film 210. Thus, the aperture ratio is not reduced.

EXAMPLE 2

Figure 4:
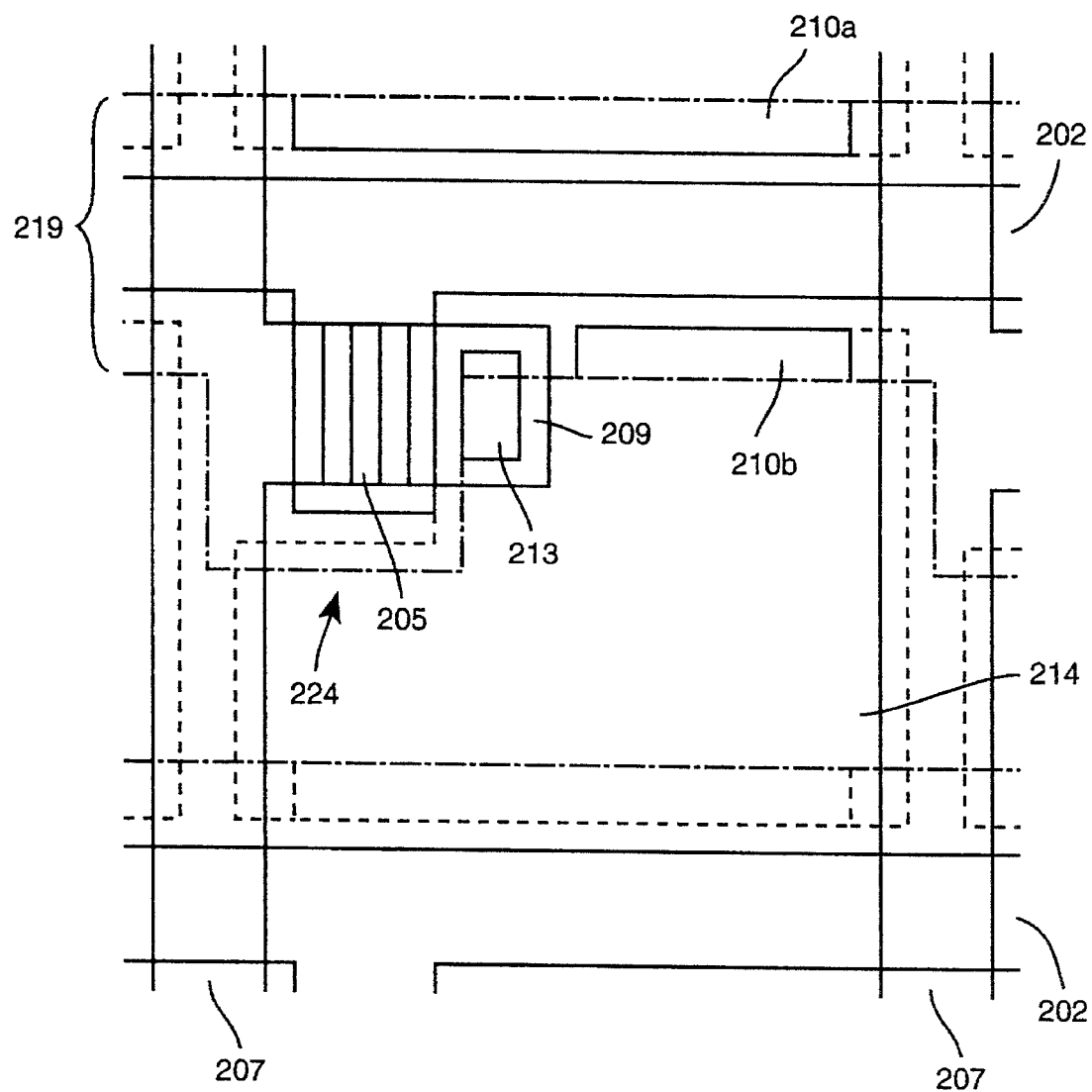
FIG. 4 is a fragmentary plan view of an active matrix liquid crystal display as a second example of the present invention.

FIG. 4 is a plan view showing an active matrix liquid crystal display of this example. Like reference numerals designate like parts shown in FIG. 1.

In the liquid crystal display of this example, the drain electrode/shielding film 208 is divided into a drain electrode 209 and a shielding film 210b, which are formed separately, having no electrical connection to each other. Also in this example, the shielding films 210a and 210b are formed so as not to overlap the gets lines 202, and the gate lanes 202 and the pixel electrodes 214 do not overlap each other. Further, the counter shielding film 219 is formed on the counter substrate 223 so as to cover a gap between the shielding film 210 and the gate line 202 and a gap between the shielding film 210b and the gate line 202. However, when the end of the pixel electrode 214 is not located just above the end of the shielding film 210b, the counter shielding film 219 covers the smaller one of: (1) gaps between the gate line 202 and the shielding film 210b; and (2) gaps between the gate line 202 and the pixel electrode 214. When the end of the pixel electrode 214 is not located just above the end of the shielding film 210, the counter shielding film 219 is provided so as to cover the smaller one of: (1) gape between the gate line 202 and the shielding film 210; and (2) gaps between the gate line 202 and the pixel electrode 214.

In the above described two examples, none of the shielding films overlap the gate lines. Therefore, a parasitic capacitance is not caused between the shielding films and the gate lines 202. In addition, a parasitic capacitance is not caused between the gate lines 202 and the pixel electrodes 214 because the gate lines 202 do not overlap the pixel electrodes 214. In this manner, the display characteristics are improved as compared with those in the conventional structure. Furthermore, the counter shielding film covers a smaller one of: 1) gape between the shielding film 210 or 210b (or the drain electrode/shielding film 208) and the gate line 202; and 2) gaps between the pixel electrode 214 and the gate line 202. Thus, a light leak through the gap can be shielded. Moreover, since the counter shielding film can be small because it must shield only the above-mentioned gap, the aperture ratio is prevented from degrading. Additionally, the yield is not reduced because the production requires no additional steps.

EXAMPLE 3

Figure 5:
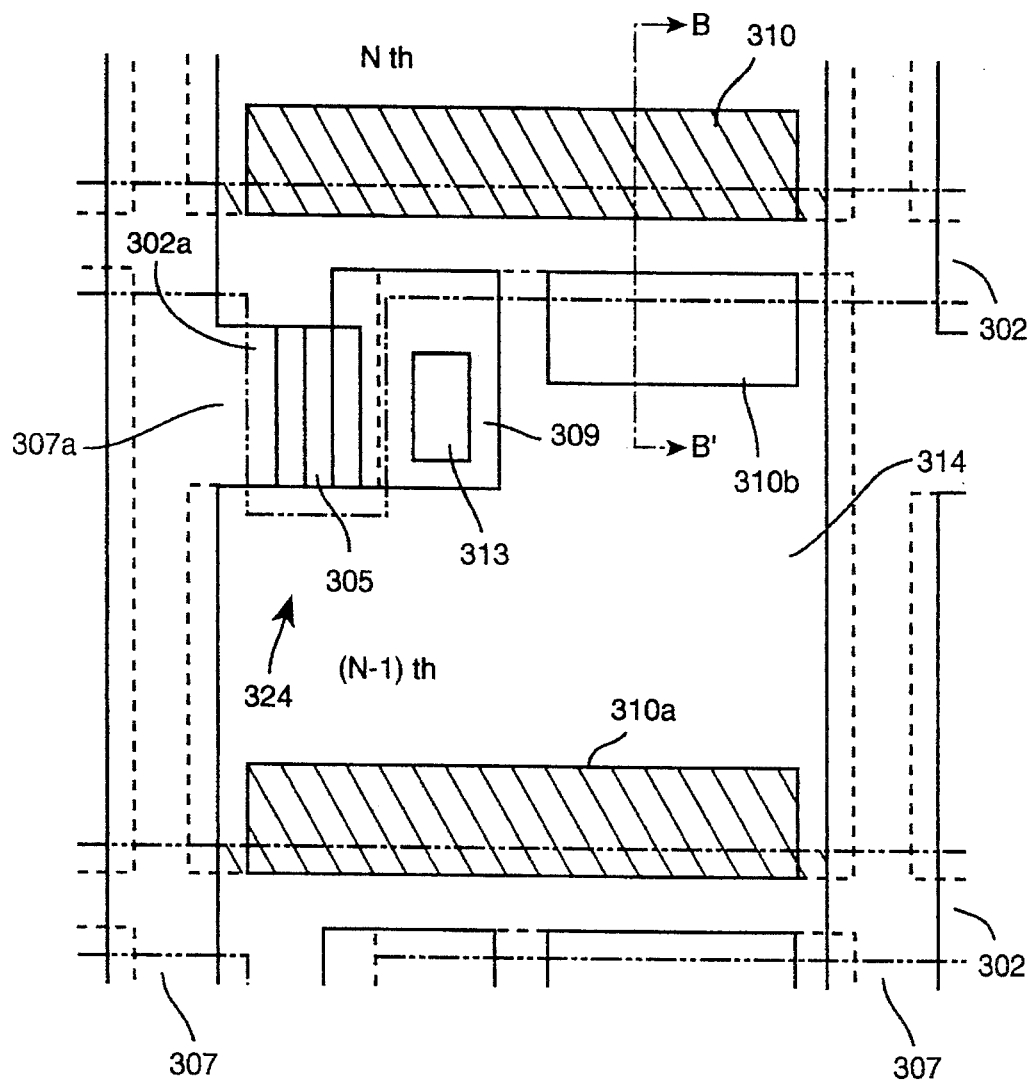
FIG. 5 is a fragmentary plan view of an active matrix liquid crystal display as a third example of the present invention.
Figure 6:
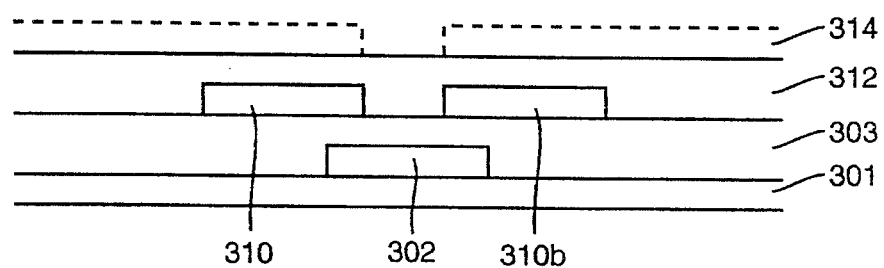
FIG. 6 is a sectional view taken on line B-B' of the liquid crystal display of FIG. 5.

FIG. 5 is a plan view showing an active matrix liquid crystal display according to this example. FIG. 6 is a sectional view taken on line B-B' of the active matrix liquid crystal display of FIG. 5. The liquid crystal display comprises an active matrix substrate on which TFTs 324 are formed in the shape of a matrix, a counter substrate opposed to the active matrix substrate and a liquid crystal layer sandwiched therebetween.

The active matrix substrate comprises an insulating glass substrate 301 as the lowest layer, gate lines 302 formed thereon as horizontally extending scanning lines, and gate electrodes 302a of the TFTs 324 branched from the gate lines 302.

On the glass substrate 301 bearing the gate lines 302 and gate electrodes 302a, a first insulating film 303 made from $SiN_x$ is formed, and an a-Si layer (not shown) is further formed so as to cover the first insulating film 303 at positions where the gate electrodes 302a are formed. A second insulating film 305 also made from $SiN_x$ is formed on the a-Si film. Source lines 307 as vertical signal lines made from a metal and source electrodes 307a of the TFTs 324 branched from the source lines 307 are disposed on the resultant glass substrate 301. Each source electrode 307a partially overlays a left side portion of each gate electrode 302a with the first insulating film 303 and the like interposed therebetween. A drain electrode 309 of the TFT 324 is formed on a right side portion of the gate electrode 302a. A shielding film 310b is formed on the right hand side of the drain electrode 309 so as to partially overlay the gate line 302 having the first insulating film 303 and the like therebetween. Another shielding film 310 is formed facing the shielding film 310b across the gate line 302 so as to partially overlay the gate line 302 having the first insulating film 303 and the like therebetween.

Furthermore, a third insulating film 312 having a plurality of contact holes 313 are formed over almost the entire surface of the glass substrate 301 bearing the above-mentioned films, etc. ITO is deposited on the third insulating film 312 so as to come in contact with the drain electrode 309 through each contact hole 313, thereby forming pixel electrodes 314. An alignment layer (not shown) is further formed on the top surface of the resultant glass substrate 301.

The counter substrate opposed to the above-mentioned active matrix substrate has a conventional structure.

A production method for such an active matrix liquid crystal display will now be described referring to FIGS. 7A through 7D.

(1) As is shown in FIG. 7a, a Ta film having a thickness of, for example, 3000 angstroms is formed and patterned on the glass substrate 301, thereby forming the gate lines 302 and the gate electrodes 302a.

(2) The $SiN_x$ film as the first insulating film 303 having a thickness of, for example, 3000 angstroms is formed by spattering or plasma CVD on the entire surface of the glass substrate 301 obtained in step (1). The a-Si layer (not shown) as the semiconductor layer of the TFTs 324 having a thickness of, for example, 300 angstroms and the $SiN_x$ film as the second insulating film 305 having a thickness of, for example, 2000 angstroms are then successively formed on the entire top surface of the glass substrate 301 and etched to pattern the second insulating film 305 as is shown in FIG. 7B.

An additional insulating film can be formed by an anodization of the gate lines 302 and the gate electrode 302a before the first insulating film 303. The second insulating film 305 can be made from any other insulating materials apart from $SiN_x$.

(3) Then, a-Si doped with P having a thickness of, for example, 500 angstroms is coated on the entire top surface by plasma CVD and patterned to provide a-Si layers (not shown) at portions where the TFTs 324 are formed. A Mo layer having a thickness of, for example, 2000 angstroms is formed by spattering and etched to form the source lines 307, the source electrodes 307a, the drain electrodes 309 in a pattern as is shown in FIG. 7C.

A Cr layer having a thickness of, for example, 1000 angstroms is formed by spattering, etched in a pattern as is shown in FIG. 7C to form the shielding films 310 and 310b.

Next, the third insulating film 312 is formed by coating the entire top surface of the resultant glass substrate 301 with an organic passivation having a thickness of, for example, 1 µm. Then the contact holes 313 are formed by etching on the third insulating film 312. Examples of a material for the organic passivation include an acrylic resin such as JSS-7215 (produced by Japan Synthetic Rubber Co., Ltd. ), a polyimide such as PIX-8803 (produced by Hitachi Chemical Co., Ltd. ), and a photosensitive polyimide such as S414 (produced by Toray Industries, Inc.). The third insulating film 312 can be made from an inorganic material such as $SiN_x$, $SiO_2$ and the like apart from the organic materials.

(4) Finally, ITO having a thickness of, for example, 1000 angstroms is deposited on the third insulating film 312 by spattering, and etched to form the pixel electrodes 314 so as to overlay the contact holes 313 and the shielding films 310 and 310b. Thus, the active matrix substrate of this example is obtained.

The above described production steps can be simplified by forming the shielding films 310 and 310b by using the same metal as is used for the source line at the same time of forming the source lines 307 and the source electrodes 307a as in Example 1.

The counter substrate fabricated in the conventional manner is adhered to the active matrix substrate, and liquid crystal is injected therebetween as the liquid crystal layer. The active matrix liquid crystal display of this example is fabricated in this manner.

During the production, each gate line 302 is electrically connected to the counter electrode on the counter substrate. For example, they are connected to each other in a circuit for driving the liquid crystal display so that a signal input to the gate line 302 is synchronized with a signal input to the counter electrode. Namely, when the counter electrode is driven by an AC current, the gate lines 302 are also driven by an AC current. The gate lines can be connected to the counter electrode in any of the other optional manners.

The function of the active matrix liquid crystal display will now be described. In the following description, the pixel in the center of FIG. 5 is taken as the (N-1)th pixel, and one on the upside thereof is taken as the Nth pixel.

The shielding film 310 which is formed so as to cover the pixel electrode 314 belonging to the Nth pixel and the gate line 302 belonging to the adjacent (N-1)th pixel is electrically connected to the counter electrode on the counter substrate via the gate lines 302. Therefore, part of a parasitic capacitance caused in portions marked with oblique lines in FIG. 5, that is, portions between the pixel electrode 314 and the shielding film 310 and between the pixel electrode 314 and the gate line 302, is connected in parallel to a capacitance of the liquid crystal, and is thus used as a storage capacitance. As a result, the display characteristics can be improved because an effect of the parasitic capacitance on the display characteristics, i.e., a ratio obtained by the Equation (I) is minimized because the denominator becomes large. Moreover, the aperture ratio and the yield are not reduced because there is no need to provide storage capacitance lines, otherwise which increases the number of the production steps.

EXAMPLE 4

Figure 8:
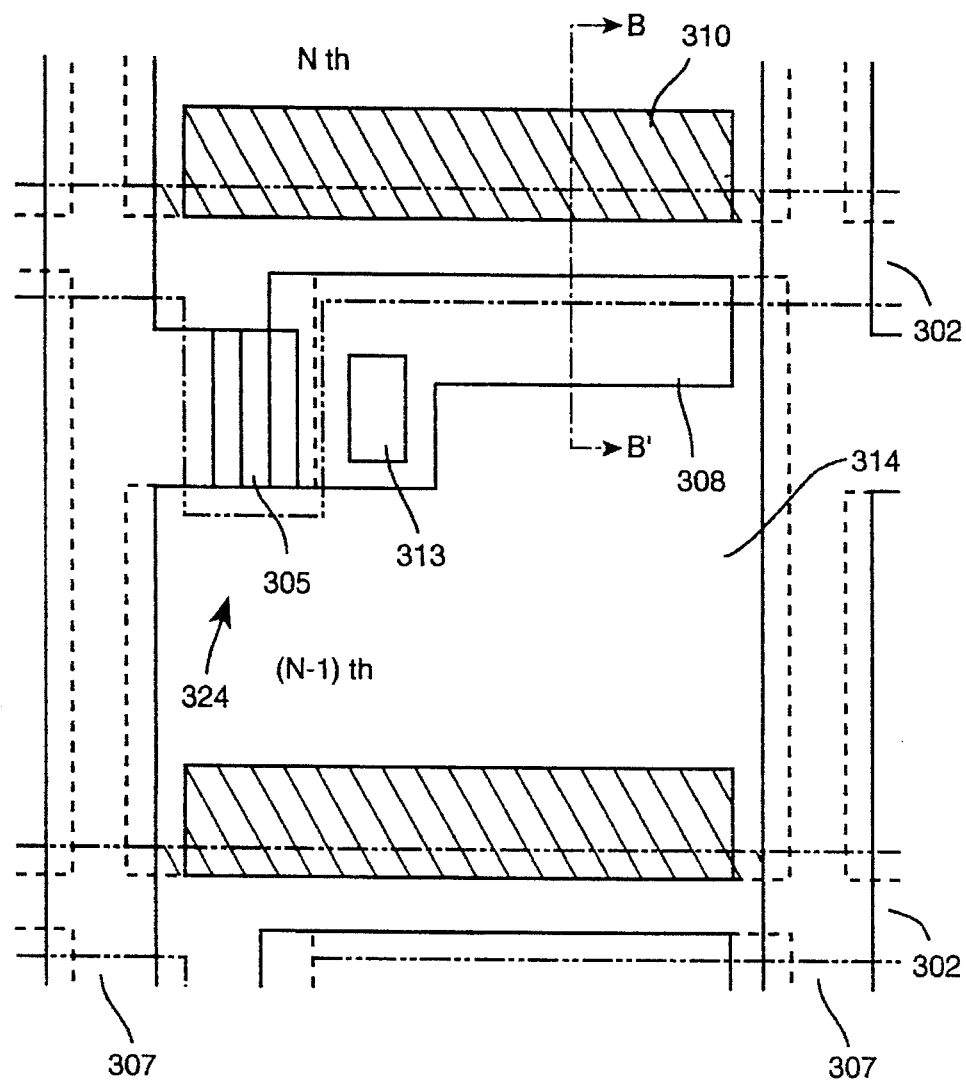
FIG. 8 is a fragmentary plan view of an active matrix liquid crystal display as a fourth example of the present invention.
Figure 9:
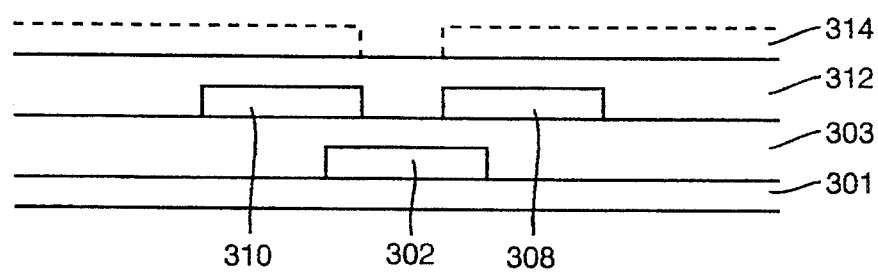
FIG. 9 is a sectional view taken on line B-B' of the liquid crystal display of FIG. 8.

FIG. 8 is a plan view showing an active matrix substrate of an active matrix liquid crystal display according to this example. FIG. 9 is a sectional view taken on line B-B' of FIG. 8. The pixel in the center of FIG. 8 is taken as the (N-1)th pixel, and one on the upside thereof is taken as the Nth pixel. Like reference numerals indicate like parts shown in FIG. 5.

The active matrix liquid crystal display according to this example has a structure identical to that in Example 3 except for a drain electrode/shielding films 308 as in Example 1. The production method is also identical to that of Example 3 except for the following: Instead of forming the drain electrode 309 by etching the Mo layer as in Example 3, the drain electrode/shielding films 308 are formed in a pattern as is shown in FIG. 8, and the shielding films 310 in the indicated pattern are formed using the Cr layer.

The function of the active matrix liquid crystal display will now be described. The shielding film 310 which is formed so as to cover the pixel electrode 314 belonging to the Nth pixel and the gate line 302 belonging to the adjacent (N-1)th pixel is electrically connected to the counter electrode on the counter substrate via the gate lines 302. Therefore, part of a parasitic capacitance caused in portions marked with oblique lines in FIG. 5, that is, portions between the pixel electrode 314 and the shielding film 310 and between the pixel electrode 314 and the gate line 302, is connected in parallel to a capacitance of the liquid crystal, and is thus used as a storage capacitance, resulting in obtaining the same effect as is in Example 3. Moreover, this liquid crystal display adopts the drain electrode/shielding film 308 integrally working as both the drain electrode and the shielding film, therefore, there is no gap between the drain electrode and the shielding film as is In Example 3. As a result, the degradation of contrast due to light leak through such a gap can be avoided.

EXAMPLE 5

Figure 10:
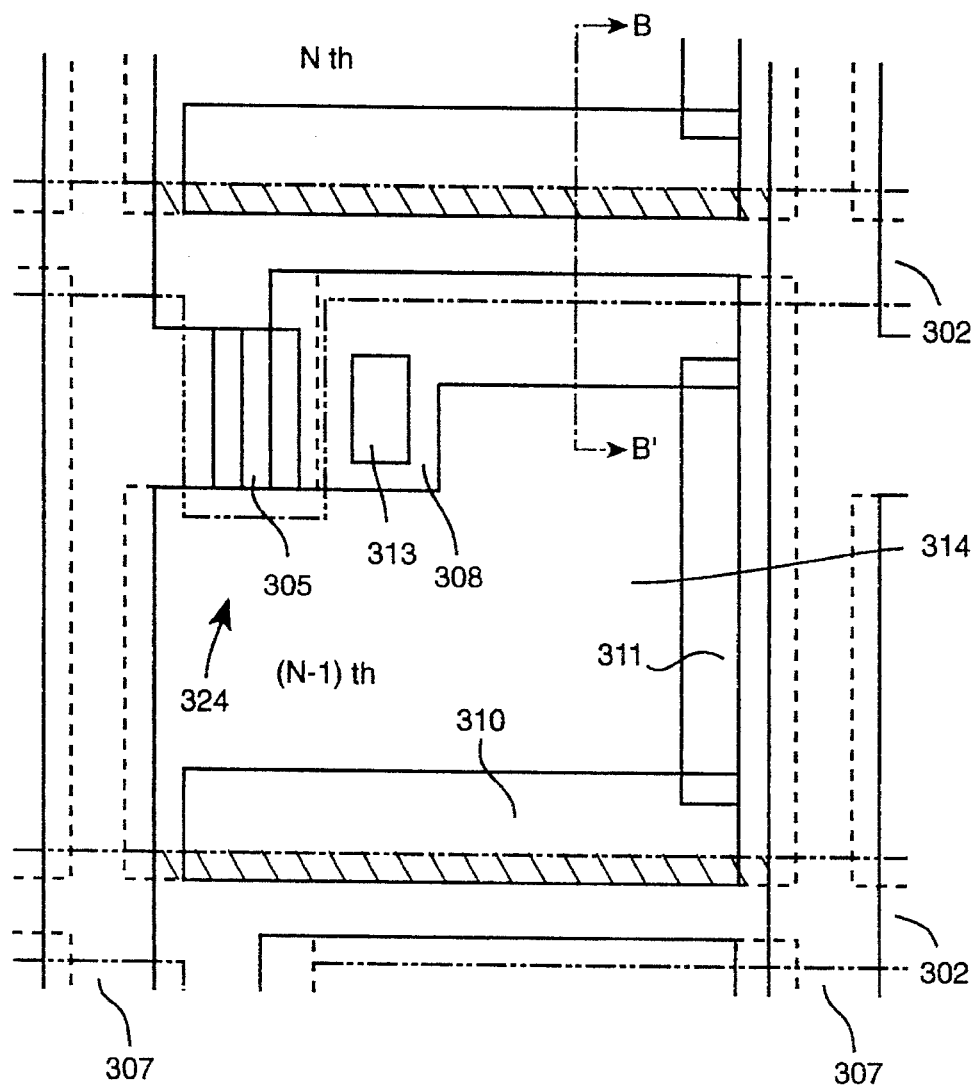
FIG. 10 is a fragmentary plan view of an active matrix liquid crystal display as a fifth example of the present invention.
Figure 11:
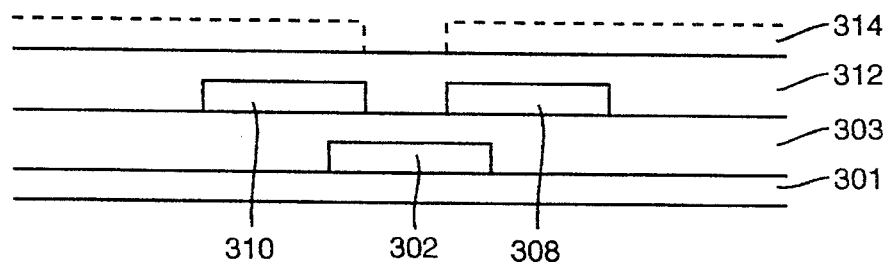
FIG. 11 is a sectional view taken on line B-B' of the liquid crystal display of FIG. 10.

FIG. 10 is a plan view showing an active matrix substrate of an active matrix liquid crystal display according to Example 5. FIG. 11 is a sectional view taken on line B-B' of FIG. 10. The pixel in the center of FIG. 10 is taken as the (N-1)th pixel, and one on the upside thereof is taken as the Nth pixel. Like reference numerals indicate like parts shown in FIG. 8.

The active matrix liquid crystal display of this example has an identical structure to that of Example 4 except further comprising a transparent and conductive connecting piece 311 for electrically connecting the drain electrode/shielding film 308 to the shielding film 310. The connecting piece 311 works as a drain electrode line. The production method is also identical to that of Example 4 except a production step for the connecting piece 311 is added as follows: After forming the shielding film 310 as in Example 4, an ITO layer with a thickness of 1000 angstroms is coated by spattering and is etched in a pattern as is shown in FIG. 10 to form the connecting piece 311. The third insulating film 312 is formed over the connecting piece 311.

Therefore, part of a parasitic capacitance caused in portions marked with oblique lines in FIG. 10, that is, portions between the pixel electrode 314 and the gate line 302, is connected in parallel to a capacitance of the liquid crystal, and is thus used as a storage capacitance. The parasitic capacitance is smaller than in Examples 3 and 4, since the shielding film 310 is connected to the pixel electrode 314 via the drain electrode/shielding film 308. Accordingly, although a smaller amount of the parasitic capacitance is used as the storage capacitance than in Examples 3 and 4, images can be displayed at high quality because the amount of the parasitic capacitance is smaller.

Figure 12A:
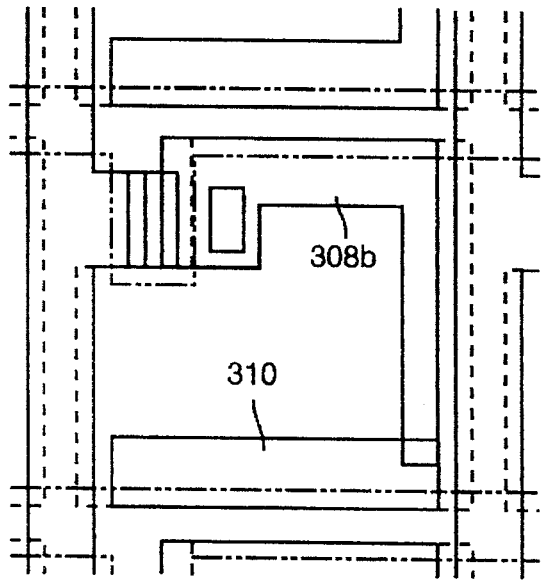
FIGS. 12A through 12C are plan views showing different applications of the active matrix substrate in the liquid crystal display of the fifth example.
Figure 12B:
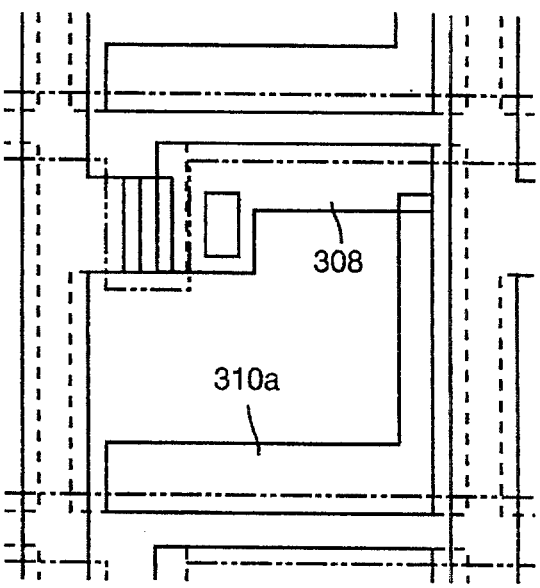
Figure 12C:
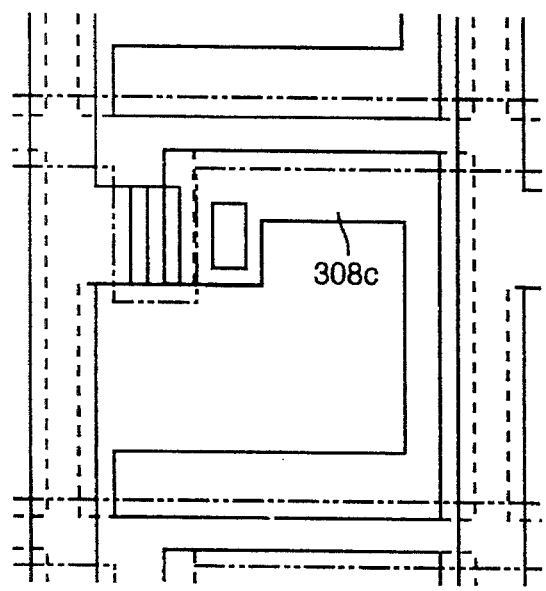

The present example can be applied to various types of active matrix substrates as shown in FIGS. 12A through 12C.

The active matrix substrate shown in FIG. 12A comprises a drain electrode/line/shielding film 308b, which works both as the drain electrode/shielding film 308 of this example and as a drain electrode line. In this active matrix substrate, the drain electrode/line/shielding film 308b is electrically connected to the shielding film 310.

The active matrix substrate shown in FIG. 12B comprises a drain line/shielding film 310a, which works both as the shielding film 310 of this example and as a drain electrode line. In this active matrix substrate, the drain line/shielding film 310a is electrically connected to the drain electrode/shielding film 308.

The active matrix substrate shown in FIG. 12C comprises a drain electrode/shielding film 308c extending along three sides of the pixel electrode 314 excluding one side which is not adjacent to the gate lines 302. The drain electrode/shielding film 308c works as both the drain electrode/shielding film 308 of this example and the shielding film 310.

In the above-mentioned three applications, the production steps can be simplified because there is no need to form the connecting piece 311.

EXAMPLE 6

Figure 13:
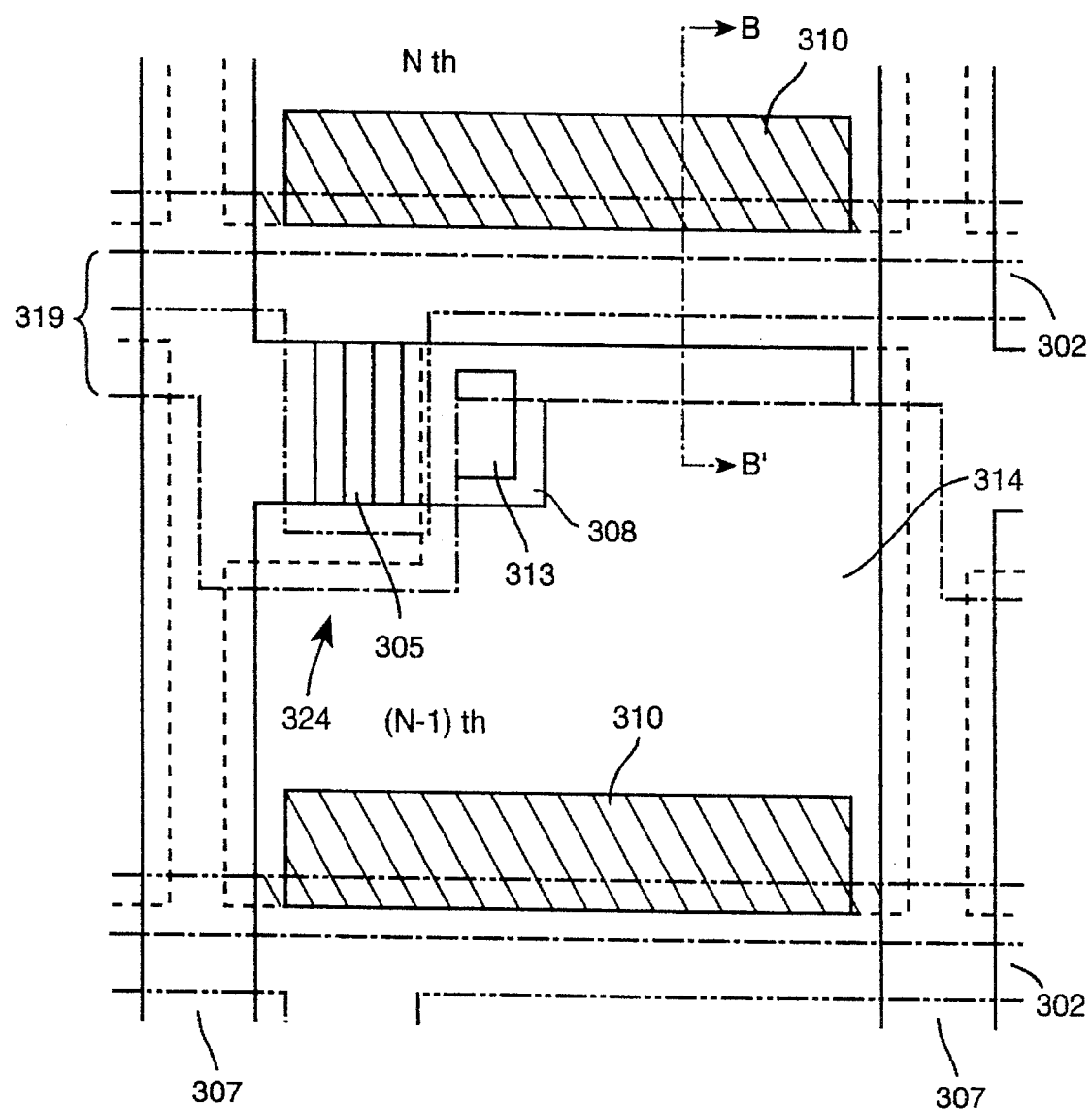
FIG. 13 is a fragmentary plan view of an active matrix liquid crystal display of a sixth example of the present invention.
Figure 14:
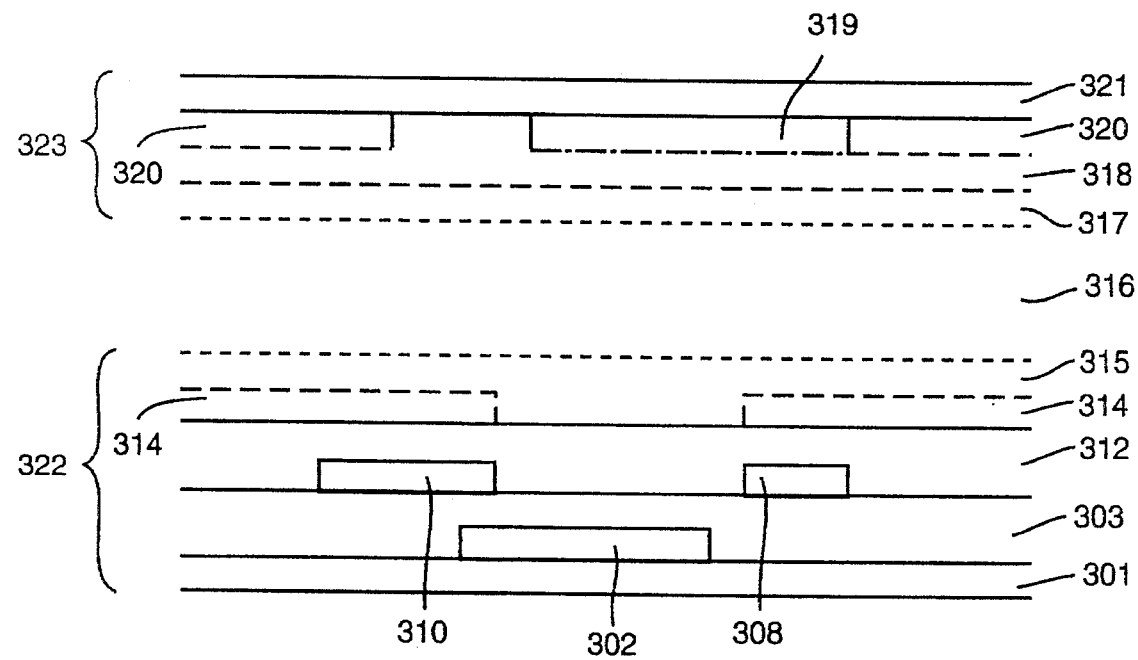
FIG. 14 is a sectional view taken on line B-B' of the liquid crystal display of FIG. 13.
Figure 15:
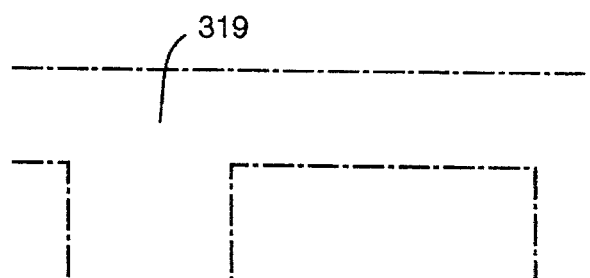
FIG. 15 is a diagram showing a pattern of a shielding film formed on a counter substrate of the liquid crystal display of FIG. 13.
Figure 16:
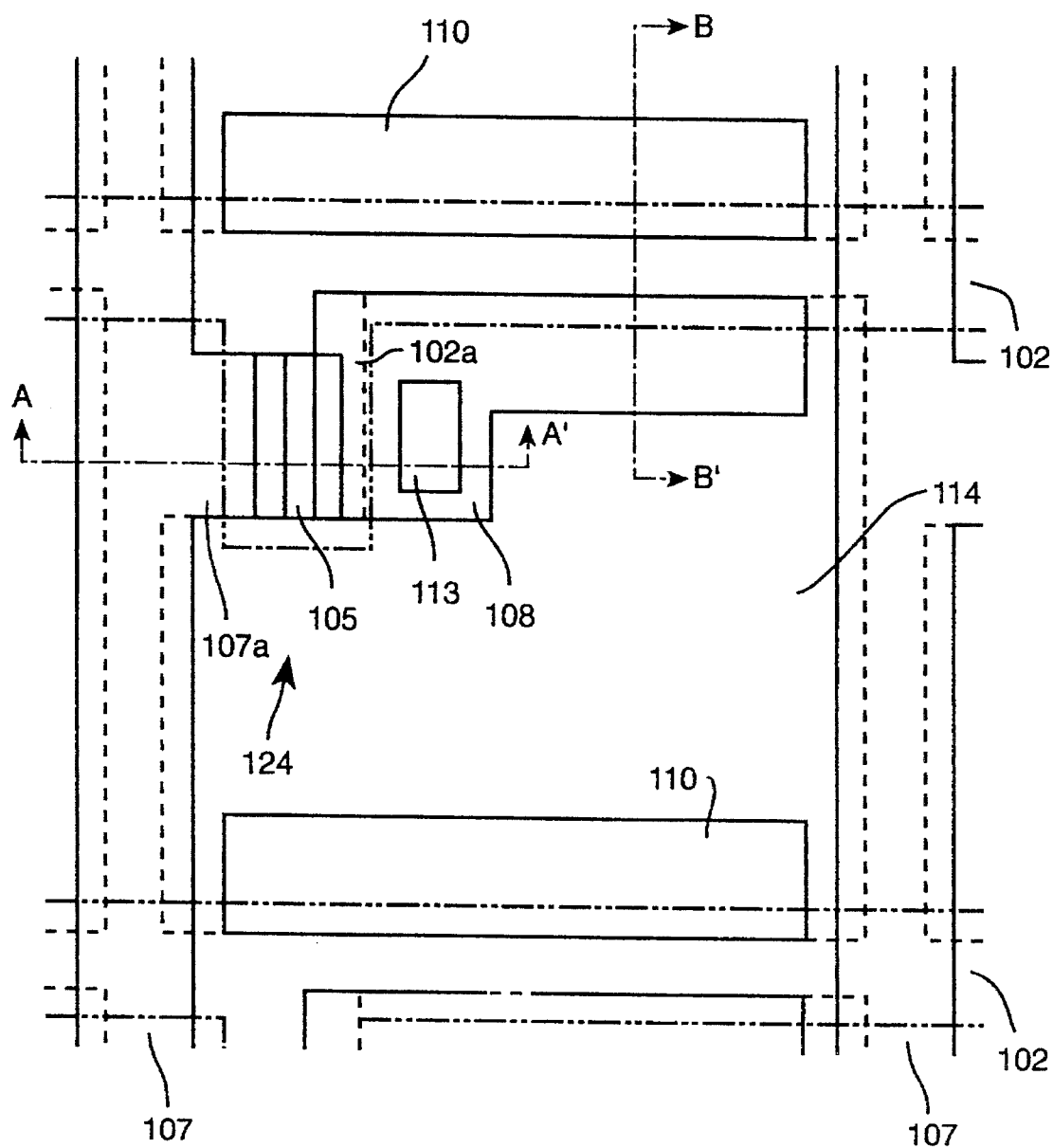
FIG. 16 is a fragmentary plan view of a conventional active matrix liquid crystal display.
Figure 17:
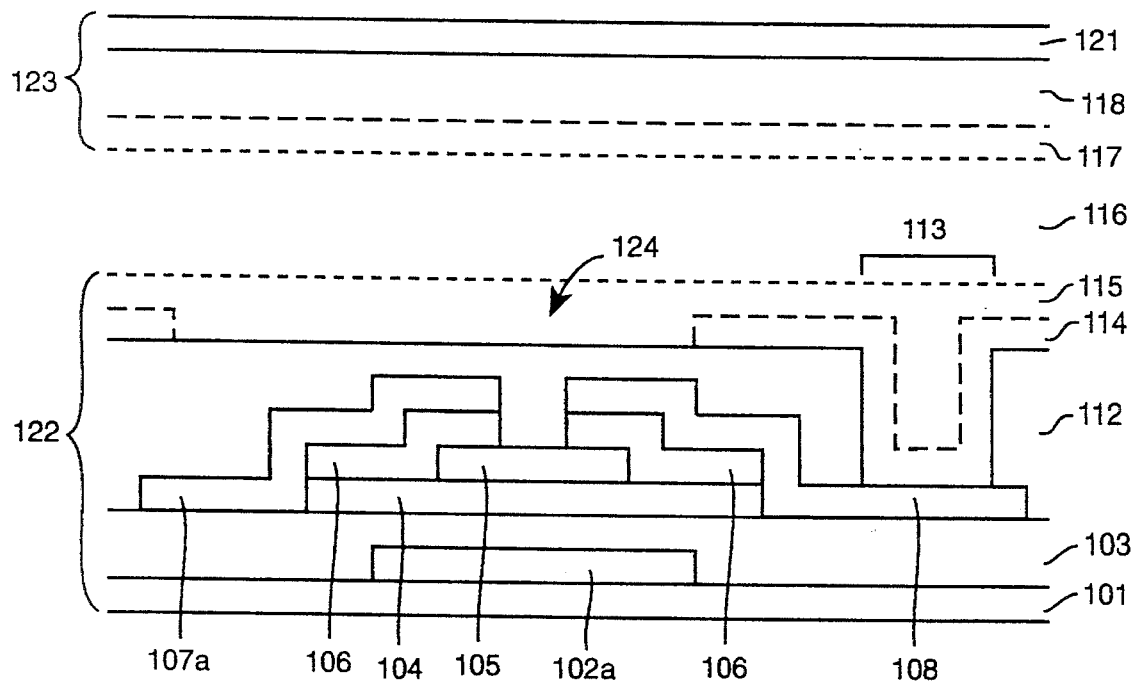
FIG. 17 is a sectional view taken on line A-A' of the conventional liquid crystal display of FIG. 16.

FIG. 13 is a plan view showing an active matrix substrate of an active matrix liquid crystal display according to this example. FIG. 14 is a sectional view taken on line B-B' of FIG. 13. Like reference numerals indicate like parts shown in FIG. 8.

This active matrix liquid crystal display comprises an active matrix substrate 322 on which the TFTs 324 are formed in the shape of a matrix, a counter substrate 323 opposed to the active matrix substrate 322 and a liquid crystal layer 316 sandwiched therebetween.

The active matrix substrate 322 is almost identical to that of Example 4. But the end of the drain electrode/shielding film 308 is not located just above the end of the gate line 302 but there is a gap between the two ends.

The counter substrate 323 comprises shielding films 319 formed on a glass substrate 321 so as to cover the above-mentioned gap. Color falters 320 are opposed to the pixel electrodes 314 on the active matrix substrate 322, and an alignment layer 317 is further formed thereon. The color filters 320 can be omitted, if desired.

The production method for such an active matrix liquid crystal display is as follows:

The active matrix substrate 322 is fabricated in the same manner as in Example 4.

The shielding films 319 are formed on the glass substrate 321 in a pattern as is shown in FIG. 8. ITO as a counter electrode 318 is deposited over the entire surface of the glass substrate 321 bearing the shielding films 319. A polyimide is coated over the counter electrode 318 to form the alignment layer 317, which is then treated by the rubbing method.

The color filters 320 are formed on portions opposed to the pixel electrodes 314, if necessary.

Finally, the active matrix substrate 322 and the counter substrate 323 are adhered to each other, and the liquid crystal is injected therebetween to form the liquid crystal layer 316.

Such an active matrix liquid crystal display has, apart from the effect obtained by utilizing the parasitic capacitance as the storage capacitance, an effect for improving the display characteristics because the light leak through the gate lines 302 as scanning lines is completely blocked.

In this example, the shielding films 319 are provided to block light leak through gaps between the drain electrode/shielding films 308 and the gate lines 302. However, the position of the shielding film 319 is not limited to this as far as light leak through the shielding film formed on the active matrix substrate can be blocked.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix liquid crystal display comprising:
   an active matrix substrate having:
      a plurality of parallel scanning lines extending in a first direction, each scanning lines having two sides which are parallel to the first direction;
      a plurality of parallel signal lines crossing the scanning lines;
      pixel electrodes respectively formed in substrate portions defined by two adjacent scanning lines and two adjacent signal lines;
      switching elements each of which is connected to a corresponding pixel electrode, a corresponding scanning line and a corresponding signal line; and
      pairs of first shielding films provided in the active matrix substrate, a film of each pair being provided in light leakage-blocking relation to a respective one of the two sides of each scanning line;
   a counter substrate opposed to the active matrix substrate having:
      a counter electrode; and
      second shielding films extending in the first direction and above the scanning lines for blocking light leakage which is not blocked by the first shielding films; and
   a liquid crystal layer between the active matrix substrate and the counter substrate.

2. An active matrix liquid crystal display according to claim 1, wherein none of the first shielding films overlay the scanning lines.

3. An active matrix liquid crystal display according to claim 2, wherein the second shielding films covers at least the smaller one of: (1) a gap between the first shielding film and the scanning line; and (2) a gap between the pixel electrode and the scanning line.

4. An active matrix liquid crystal display according to claim 1, wherein the switching elements are thin film transistors, and a drain in each thin film transistor also serves as one of the pair of first shielding films.

5. An active matrix liquid crystal display according to claim 1, wherein the signal lines are made from a type of material as used for the first shielding films.

* * * * *